US010913207B2

(12) United States Patent
Ederer et al.

(10) Patent No.: US 10,913,207 B2
(45) Date of Patent: Feb. 9, 2021

(54) 3D REVERSE PRINTING METHOD AND DEVICE

(71) Applicant: Voxeljet AG, Friedberg (DE)

(72) Inventors: Ingo Ederer, Geltendorf (DE); Daniel Günther, Munich (DE); Florian Mögele, Gessertshausen (DE)

(73) Assignee: VOXELJET AG, Friedberg (DE)

( * ) Notice: Subject to any disclaimer, the term of this patent is extended or adjusted under 35 U.S.C. 154(b) by 438 days.

(21) Appl. No.: 15/312,722

(22) PCT Filed: May 22, 2015

(86) PCT No.: PCT/DE2015/000256
§ 371 (c)(1),
(2) Date: Nov. 21, 2016

(87) PCT Pub. No.: WO2015/180703
PCT Pub. Date: Dec. 3, 2015

(65) Prior Publication Data
US 2017/0182711 A1  Jun. 29, 2017

(30) Foreign Application Priority Data
May 26, 2014 (DE) .................. 10 2014 007 584

(51) Int. Cl.
B29C 64/153 (2017.01)
B29C 64/35 (2017.01)
B33Y 70/00 (2020.01)
B33Y 10/00 (2015.01)
B33Y 30/00 (2015.01)
(Continued)

(52) U.S. Cl.
CPC .............. B29C 64/35 (2017.08); B28B 1/001 (2013.01); B29C 64/153 (2017.08); B29C 64/165 (2017.08); B33Y 10/00 (2014.12); B33Y 30/00 (2014.12); B33Y 70/00 (2014.12); B41J 2/01 (2013.01)

(58) Field of Classification Search
CPC ...... B29C 64/153; B29C 64/165; B29C 64/00
See application file for complete search history.

(56) References Cited

U.S. PATENT DOCUMENTS 3,913,503 A  10/1975 Becker
4,247,508 A  1/1981 Housholder
(Continued)

FOREIGN PATENT DOCUMENTS

AU  720255 B2  5/2000
CN  101146666 A  3/2008
(Continued)

OTHER PUBLICATIONS

US 4,937,420 A, 06/1990, Deckard (withdrawn)
(Continued)

Primary Examiner — Monica A Huson
Assistant Examiner — Kelsey C Grace
(74) Attorney, Agent, or Firm — The Dobrusin Law Firm, P.C.

(57) ABSTRACT

The present invention relates to a method and a device for producing three-dimensional models, wherein binding/bonding material is applied in layers to a building platform and media are selectively applied which delay or completely prevent the binding of the applied material.

23 Claims, 4 Drawing Sheets

(51) Int. Cl.
  *B29C 64/165* (2017.01)
  *B28B 1/00* (2006.01)
  *B41J 2/01* (2006.01)

(56) References Cited

U.S. PATENT DOCUMENTS

| | | |
|---|---|---|
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A * | 10/1994 | Feygin ............... B22C 9/00 156/245 |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,824,250 A | 10/1998 | Whalen |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,905,645 B2 | 6/2005 | Iskra |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |

(56) References Cited

U.S. PATENT DOCUMENTS

| | | | |
|---|---|---|---|
| 7,049,363 B2 | 5/2006 | Shen | |
| 7,087,109 B2 | 8/2006 | Bredt et al. | |
| 7,120,512 B2 | 10/2006 | Kramer et al. | |
| 7,137,431 B2 | 11/2006 | Ederer et al. | |
| 7,153,463 B2 | 12/2006 | Leuterer et al. | |
| 7,204,684 B2 | 4/2007 | Ederer et al. | |
| 7,220,380 B2 | 5/2007 | Farr et al. | |
| 7,291,002 B2 | 11/2007 | Russell et al. | |
| 7,296,990 B2 | 11/2007 | Devos et al. | |
| 7,332,537 B2 | 2/2008 | Bredt et al. | |
| 7,348,075 B2 | 3/2008 | Farr et al. | |
| 7,378,052 B2 | 5/2008 | Harryson | |
| 7,381,360 B2 | 6/2008 | Oriakhi et al. | |
| 7,387,359 B2 | 6/2008 | Hernandez et al. | |
| 7,402,330 B2 | 7/2008 | Pfeiffer et al. | |
| 7,431,987 B2 | 10/2008 | Pfeiffer et al. | |
| 7,435,072 B2 | 10/2008 | Collins et al. | |
| 7,435,368 B2 | 10/2008 | Davidson et al. | |
| 7,455,804 B2 | 11/2008 | Patel et al. | |
| 7,455,805 B2 | 11/2008 | Oriakhi et al. | |
| 7,497,977 B2 | 3/2009 | Nielsen et al. | |
| 7,531,117 B2 | 5/2009 | Ederer et al. | |
| 7,550,518 B2 | 6/2009 | Bredt et al. | |
| 7,578,958 B2 | 8/2009 | Patel et al. | |
| 7,597,835 B2 | 10/2009 | Marsac | |
| 7,641,461 B2 | 1/2010 | Khoshnevis | |
| 7,665,636 B2 | 2/2010 | Ederer et al. | |
| 7,722,802 B2 | 5/2010 | Pfeiffer et al. | |
| 7,807,077 B2 | 5/2010 | Ederer et al. | |
| 7,736,578 B2 | 6/2010 | Ederer et al. | |
| 7,748,971 B2 | 7/2010 | Hochsmann et al. | |
| 7,767,130 B2 | 8/2010 | Elsner et al. | |
| 7,795,349 B2 | 9/2010 | Bredt et al. | |
| 7,799,253 B2 | 9/2010 | Höschmann et al. | |
| 7,879,393 B2 | 2/2011 | Ederer et al. | |
| 7,887,264 B2 | 2/2011 | Naunheimer et al. | |
| 7,927,539 B2 | 4/2011 | Ederer | |
| 8,020,604 B2 | 9/2011 | Hochsmann et al. | |
| 8,096,262 B2 | 1/2012 | Ederer et al. | |
| 8,186,415 B2 | 5/2012 | Marutani et al. | |
| 8,349,233 B2 | 1/2013 | Ederer et al. | |
| 8,506,870 B2 | 8/2013 | Hochsmann et al. | |
| 8,524,142 B2 | 9/2013 | Unkelmann et al. | |
| 8,574,485 B2 | 11/2013 | Kramer | |
| 8,715,832 B2 | 5/2014 | Ederer et al. | |
| 8,727,672 B2 | 5/2014 | Ederer et al. | |
| 8,741,194 B1 | 6/2014 | Ederer et al. | |
| 8,911,226 B2 | 12/2014 | Gunther et al. | |
| 8,951,033 B2 | 2/2015 | Höchsmann et al. | |
| 8,956,140 B2 | 2/2015 | Hartmann | |
| 8,956,144 B2 | 2/2015 | Grasegger et al. | |
| 8,992,205 B2 | 3/2015 | Ederer et al. | |
| 9,174,391 B2 | 11/2015 | Hartmann et al. | |
| 9,174,392 B2 | 11/2015 | Hartmann | |
| 9,242,413 B2 | 1/2016 | Hartmann et al. | |
| 9,321,934 B2 | 4/2016 | Mögele et al. | |
| 9,327,450 B2 | 5/2016 | Hein et al. | |
| 9,333,709 B2 | 5/2016 | Hartmann | |
| 9,358,701 B2 | 6/2016 | Gnuchtel et al. | |
| 9,388,078 B2 * | 7/2016 | Rael | C04B 14/005 |
| 2001/0045678 A1 | 11/2001 | Kubo et al. | |
| 2001/0050031 A1 | 12/2001 | Bredt et al. | |
| 2002/0015783 A1 | 2/2002 | Harvey | |
| 2002/0016387 A1 | 2/2002 | Shen | |
| 2002/0026982 A1 | 3/2002 | Bredt et al. | |
| 2002/0079601 A1 | 6/2002 | Russell et al. | |
| 2002/0090410 A1 | 7/2002 | Tochimoto et al. | |
| 2002/0111707 A1 | 8/2002 | Li et al. | |
| 2002/0155254 A1 | 10/2002 | McQuate et al. | |
| 2002/0167100 A1 | 11/2002 | Moszner et al. | |
| 2003/0004599 A1 | 1/2003 | Herbak | |
| 2003/0065400 A1 | 4/2003 | Beam et al. | |
| 2003/0069638 A1 | 4/2003 | Barlow et al. | |
| 2003/0083771 A1 | 5/2003 | Schmidt | |
| 2003/0113729 A1 | 6/2003 | DaQuino et al. | |
| 2003/0114936 A1 | 6/2003 | Sherwood et al. | |
| 2004/0003738 A1 | 1/2004 | Imiolek et al. | |
| 2004/0012112 A1 | 1/2004 | Davidson et al. | |
| 2004/0025905 A1 | 2/2004 | Ederer et al. | |
| 2004/0026418 A1 | 2/2004 | Ederer et al. | |
| 2004/0035542 A1 | 2/2004 | Ederer et al. | |
| 2004/0036200 A1 | 2/2004 | Patel et al. | |
| 2004/0038009 A1 | 2/2004 | Leyden et al. | |
| 2004/0045941 A1 | 3/2004 | Herzog et al. | |
| 2004/0056378 A1 | 3/2004 | Bredt et al. | |
| 2004/0084814 A1 | 5/2004 | Boyd et al. | |
| 2004/0094058 A1 | 5/2004 | Kasperchik et al. | |
| 2004/0104515 A1 | 6/2004 | Swanson et al. | |
| 2004/0112523 A1 | 6/2004 | Crom | |
| 2004/0137228 A1 * | 7/2004 | Monsheimer | B33Y 10/00 428/402 |
| 2004/0138336 A1 | 7/2004 | Bredt et al. | |
| 2004/0145088 A1 | 7/2004 | Patel et al. | |
| 2004/0170765 A1 | 9/2004 | Ederer et al. | |
| 2004/0187714 A1 | 9/2004 | Napadensky et al. | |
| 2004/0207123 A1 | 10/2004 | Patel et al. | |
| 2004/0239009 A1 | 12/2004 | Collins et al. | |
| 2005/0003189 A1 | 1/2005 | Bredt et al. | |
| 2005/0017386 A1 | 1/2005 | Harrysson | |
| 2005/0017394 A1 | 1/2005 | Hochsmann et al. | |
| 2005/0059757 A1 * | 3/2005 | Bredt | B29C 64/165 524/3 |
| 2005/0074511 A1 | 4/2005 | Oriakhi et al. | |
| 2005/0093194 A1 | 5/2005 | Oriakhi et al. | |
| 2005/0167872 A1 | 8/2005 | Tsubaki et al. | |
| 2005/0174407 A1 | 8/2005 | Johnson et al. | |
| 2005/0179167 A1 | 8/2005 | Hachikian | |
| 2005/0212163 A1 | 9/2005 | Bausinger et al. | |
| 2005/0218549 A1 | 10/2005 | Farr et al. | |
| 2005/0219942 A1 | 10/2005 | Wallgren | |
| 2005/0280185 A1 | 12/2005 | Russell et al. | |
| 2005/0283136 A1 | 12/2005 | Skarda | |
| 2006/0013659 A1 | 1/2006 | Pfeiffer et al. | |
| 2006/0050104 A1 * | 3/2006 | Sakakitani | B41J 2/165 347/22 |
| 2006/0061618 A1 | 3/2006 | Hernandez et al. | |
| 2006/0105102 A1 | 5/2006 | Hochsmann et al. | |
| 2006/0108090 A1 | 5/2006 | Ederer et al. | |
| 2006/0159896 A1 | 7/2006 | Pfeifer et al. | |
| 2006/0175346 A1 | 8/2006 | Ederer et al. | |
| 2006/0176346 A1 | 8/2006 | Momose | |
| 2006/0208388 A1 | 9/2006 | Bredt et al. | |
| 2006/0237159 A1 | 10/2006 | Hochsmann | |
| 2006/0251535 A1 | 11/2006 | Pfeifer et al. | |
| 2006/0254467 A1 | 11/2006 | Farr et al. | |
| 2006/0257579 A1 | 11/2006 | Farr et al. | |
| 2007/0045891 A1 | 3/2007 | Martinoni | |
| 2007/0054143 A1 | 3/2007 | Otoshi | |
| 2007/0057412 A1 | 3/2007 | Weiskopf et al. | |
| 2007/0065397 A1 | 3/2007 | Ito et al. | |
| 2007/0126157 A1 | 6/2007 | Bredt | |
| 2007/0215020 A1 | 9/2007 | Miller | |
| 2007/0238056 A1 | 10/2007 | Baumann et al. | |
| 2008/0001331 A1 | 1/2008 | Ederer | |
| 2008/0018018 A1 | 1/2008 | Nielsen et al. | |
| 2008/0047628 A1 | 2/2008 | Davidson et al. | |
| 2008/0138515 A1 | 6/2008 | Williams | |
| 2008/0187711 A1 | 8/2008 | Alam et al. | |
| 2008/0233302 A1 | 9/2008 | Elsner | |
| 2008/0237933 A1 | 10/2008 | Hochsmann et al. | |
| 2008/0241404 A1 | 10/2008 | Allaman et al. | |
| 2008/0260945 A1 | 10/2008 | Ederer et al. | |
| 2008/0299321 A1 | 12/2008 | Ishihara | |
| 2009/0011066 A1 | 1/2009 | Davidson et al. | |
| 2009/0068376 A1 | 3/2009 | Philippi et al. | |
| 2009/0261497 A1 | 10/2009 | Ederer et al. | |
| 2010/0007062 A1 | 1/2010 | Larsson et al. | |
| 2010/0026743 A1 | 2/2010 | Van Thillo et al. | |
| 2010/0152865 A1 | 6/2010 | Jonsson et al. | |
| 2010/0207288 A1 | 8/2010 | Dini | |
| 2010/0212584 A1 | 8/2010 | Ederer et al. | |
| 2010/0243123 A1 | 9/2010 | Ederer et al. | |
| 2010/0244301 A1 | 9/2010 | Ederer et al. | |
| 2010/0247742 A1 | 9/2010 | Shi et al. | |

(56) References Cited

U.S. PATENT DOCUMENTS

| | | |
|---|---|---|
| 2010/0272519 A1 | 10/2010 | Ederer et al. |
| 2010/0279007 A1 | 11/2010 | Briselden et al. |
| 2010/0291314 A1* | 11/2010 | Kashani-Shirazi ......................... B29C 64/165 427/521 |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Kim |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grasegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |
| 2017/0182711 A1 | 6/2017 | Ederer et al. |
| 2017/0197367 A1 | 7/2017 | Gunther et al. |
| 2017/0210037 A1 | 7/2017 | Ederer et al. |
| 2017/0217098 A1 | 8/2017 | Hartmann et al. |
| 2017/0297263 A1 | 10/2017 | Ederer et al. |
| 2017/0305139 A1 | 10/2017 | Hartmann |
| 2017/0326693 A1 | 11/2017 | Ederer et al. |
| 2017/0355137 A1 | 12/2017 | Ederer et al. |
| 2018/0079133 A1 | 3/2018 | Ederer et al. |
| 2018/0141271 A1 | 5/2018 | Gunter et al. |
| 2018/0141272 A1 | 5/2018 | Hartmann et al. |
| 2018/0169758 A1 | 6/2018 | Ederer et al. |
| 2018/0222082 A1 | 8/2018 | Gunther et al. |
| 2018/0222174 A1 | 8/2018 | Guneter et al. |

FOREIGN PATENT DOCUMENTS

| | | |
|---|---|---|
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69301808 T2 | 4/1998 |
| DE | 19853834 | 5/2000 |
| DE | 69634921 T2 | 12/2005 |
| DE | 201 22 639 U1 | 11/2006 |
| DE | 102006040305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |
| DE | 102015006363 A1 | 12/2016 |
| DE | 102015008860 A1 | 1/2017 |
| DE | 102015011503 A1 | 3/2017 |
| DE | 102015011790 A1 | 3/2017 |
| EP | 361847 B1 | 4/1990 |
| EP | 0 431 924 A2 | 12/1990 |
| EP | 1400340 A1 | 3/2004 |
| EP | 1415792 | 5/2004 |
| EP | 1457590 A | 9/2004 |
| EP | 1381504 B1 | 8/2007 |
| GB | 2297516 A | 8/1996 |
| JP | S62275734 A | 11/1987 |
| JP | 2003136605 A | 5/2003 |
| JP | 2004082206 A | 3/2004 |
| JP | 2009202451 A | 9/2009 |
| WO | 90/03893 A1 | 4/1990 |
| WO | 01/38061 A1 | 5/2001 |
| WO | 01/40866 A2 | 6/2001 |
| WO | 01/078969 A2 | 10/2001 |
| WO | 2004/014637 A1 | 2/2004 |
| WO | 2006/100166 A1 | 9/2006 |
| WO | 2007/114895 A2 | 10/2007 |
| WO | 2008/049384 A1 | 5/2008 |
| WO | 2008061520 A2 | 5/2008 |
| WO | 2011/067319 A1 | 6/2011 |
| WO | 2011063786 A1 | 6/2011 |
| WO | 2013075696 A1 | 5/2013 |
| WO | 2014090207 A1 | 6/2014 |
| WO | 2014166469 A1 | 10/2014 |
| WO | 2015078430 A1 | 6/2015 |
| WO | 2015081926 A1 | 6/2015 |
| WO | 2015085983 A2 | 6/2015 |
| WO | 2015090265 A1 | 6/2015 |
| WO | 2015090567 A1 | 6/2015 |
| WO | 2015096826 A1 | 7/2015 |
| WO | 2015149742 A1 | 10/2015 |
| WO | 2015180703 A1 | 12/2015 |
| WO | 2016019937 A1 | 2/2016 |
| WO | 2016019942 A1 | 2/2016 |
| WO | 2016058577 A1 | 4/2016 |
| WO | 2016095888 A1 | 6/2016 |
| WO | 2016101942 A1 | 6/2016 |
| WO | 2016146095 A1 | 9/2016 |

OTHER PUBLICATIONS

International Search Report, Application No. PCT/DE2015/000256, dated Sep. 16, 2015.

(56) References Cited

OTHER PUBLICATIONS

Written Opinion of the International Search Authority, Application No. PCT/DE2015/000256, dated Sep. 16, 2015.
Marcus et al., Solid Freedom Fabrication Proceedings, Nov. 1993.
Cima et al., "Computer-derived Microstructures by 3D Printing: Bio- and Structural Materials," SFF Symposium, Austin, TX, 1994.
Marcus, et al., Solid Freeform Fabrication Proceedings, Sep. 1995, p. 130-33.
Gebhart, Rapid Prototyping, pp. 118-119, 1996.
Feature Article—Rapid Tooling—Cast Resin and Sprayed Metal Tooling by Joel Segal, Apr. 2000.
EOS Operating Manual for Laser Sintering Machine with Brief Summary Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?"

\* cited by examiner

3D REVERSE PRINTING METHOD AND DEVICE

CLAIM OF PRIORITY

This application is a national phase filing under 35 USC § 371 of PCT Application serial number PCT/DE2015/000256 filed on May 22, 2015, and claims priority therefrom. This application further claims priority to German Patent Application Number DE 10 2014 007 584.2 filed on May 26, 2014. PCT Application Number PCT/DE2015/000256 and German Patent Application Number DE 10 2014 007 584.2 are each incorporated herein by reference in its entirety.

The invention relates to a method and a device for producing three-dimensional models, wherein binding/bonding material is applied in layers to a building platform and media are selectively applied which delay or completely prevent the binding of the applied material.

A method for producing three-dimensional objects from computer data is described, for example, in EP 0 431 924 B1. In this method, a particulate material is deposited in a thin layer onto a platform, and a binder material is selectively printed on the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas.

3D printing methods are furthermore known, in which areas are selectively printed with media for the purpose of preventing a sintering of these areas, and the unprinted areas are then permanently bonded to each other in a sintering step, whereby a three-dimensional model is ultimately created. One example of this is WO 01/38061 A1, which neither discloses nor suggests the invention.

The known 3D printing methods may be used to process different particulate materials, such as natural biological raw materials, polymers, plastics, metals, ceramics and sands.

Binders that are used outside of 3D printing applications are highly developed. Epoxy resin may serve as an example. When mixed with sand, for example, it results in a stone-like material with excellent strength properties.

Up to now, however, making material systems which are intrinsically advantageous for 3D printing and have very positive material properties accessible to this method has been unsuccessful either entirely or only to an unsatisfactory degree. These positive material properties are thus lost to 3D printing. The print head process component, which is able to process only a very limited range of materials and is susceptible to errors when using known and intrinsically advantageous materials, is problematic in this context.

Specifically, 3D printing methods are subject to the disadvantages described below.

Powder-based 3D printing methods are described, for example, in patent EP 0 431 924 B1. In this case, a base material in the form of powder is applied in layers. Cavities naturally result between the particles. These cavities weaken the strength of the printed component.

To increase the strength, the cavities must be filled with material that is introduced through the print head in liquid form. The printed material must harden without drying. Since the material is dosed via the print head, relatively low viscosities in the liquid state are necessary, especially in the ink jet methods used here.

For example, if we examine the material system of concrete, we will see that concrete mixed at the point of use solidifies on its own without supplying any air. However, the cement paste per se cannot be processed with the aid of an ink jet print head.

Reactive resin systems may be a second example. These materials polymerize, e.g., after the mixing of two reactive components, and thus harden. The chain length of the prepolymers is usually very high in this case in order to minimize shrinkage during the reaction. The health hazard decreases as the chain length of the prepolymers increases, although the viscosity also increases. Such material systems are thus usually difficult or impossible to print.

Another feature of such products is that they require intimate mixing prior to casting. Only by doing so is the right reaction between the functional groups in the viscous medium ensured. A mixture of this type would have to take place prior to the dosing operation and would thus endanger the print head, since the mixture may harden in the print head before it is dosed.

One objective of the invention is to make the use of standard materials having positive material properties accessible to 3D printing or to avoid or at least reduce the disadvantages of the prior art.

The approach according to the invention is achieved in one aspect by a method for producing three-dimensional models using a layering technique, wherein particulate build material is applied to a build space in a defined layer thickness in the form of powder or dispersion, a liquid is then selectively applied via a print head to the build material in the areas in which the build material is not to be solidified by a solidification reaction, the build space is moved, preferably lowered, raised or horizontally moved, by the layer thickness, and these steps are repeated until the desired model is produced, wherein the solidification reaction of the build material has already started, starts or may be started by introducing energy upon the application of the build material, and a reaction-inhibiting or reaction-stopping liquid is selectively applied by the print head, and no binder material is preferably applied and/or no sintering step is carried out.

In one aspect, the invention essentially consists in making the mixing and consolidation methods known from material processing usable for 3D printing when using standard materials by applying a method in which the negative of the necessary mold is treated in layers with a retarding agent.

The advantage of the method according to the invention is that material systems having advantageous material properties may now be made accessible to 3D printing. It is thus possible to produce 3D models having very good molding properties cost-effectively and in a time-saving manner.

The advantage of the invention also consists in the fact that a building material which solidifies over time may be applied in layers, and a 3D model having good material properties may thus be produced without requiring any additional treatment or solidification steps, such as sintering.

The present invention and, in particular, the method according to the invention, relate to a 3D printing method with the proviso that the latter does not involve any sintering step and preferably uses material systems or materials other than those in WO 01/38061 A1.

The difference between the invention described in the present case and, for example, WO 01/38061 A1 is, in particular, that the method described therein relates to a sintering method. A method having a sintering step is preferably excluded from the scope of protection of the present invention or represents a disclaimer.

A number of terms in the invention are explained in greater detail below.

Within the meaning of the invention, "3D printing method" or "layering technique" relates to all methods known from the prior art which facilitate the construction of models in three-dimensional forms and are compatible with suitable method components and devices. In particular, these are powder-based methods, which may be carried out using suitable material systems.

"Molded body," "model" or "component" within the meaning of the invention are all three-dimensional objects that are produced with the aid of the method according to the invention and/or the device according to the invention and which have a nondeformability.

Any known 3D printing device that contains the necessary components may be used as the "device" for carrying out the method according to the invention. Common components include a coater, a build space, a means for moving the build space or other components, a dosing device and a heating means and other components which are known to those skilled in the art and therefore do not need to be listed in greater detail here.

All materials in powder form, in particular sands, ceramic powders, metal powders, plastics, wood particles, fibrous materials, celluloses and/or lactose powders may be used as "particulate materials." The particulate material is preferably a dry, free-flowing or a cohesive, firm powder. Dispersions of the particulate materials employed may also be used.

"Build space" is the geometric place in which the particulate material feedstock grows during the build process by repeated coating with particulate material. The build space is generally delimited by a floor, the building platform, by walls and an open cover surface, the build plane.

"Building platform" within the meaning of the invention is the plane on which the model is built. It may be moved after each layer application during the construction of the model. The building platform may be mounted in the device essentially horizontally or at an angle.

A "moving" of the building platform means that the building platform is lowered, raised or moved horizontally by one layer thickness in order to apply the next layer.

"IR heating" in this patent means an irradiation of the build space using an infrared emitter. The emitter may be static, or it may be moved over the build space with the aid of a positioning unit.

"UV hardening" refers to the initiation of a material system by means of radiation. The wavelength of the radiation does not necessarily have to be in the spectrum of the UV radiation. Wavelengths of the UV-Vis and Vis classes may also be used. A radiation of this type may be used as the activation step.

"Build material" within the meaning of the invention is any material or material mixture that may be applied with the aid of a device within the meaning of the invention. These may be powders or particulate materials. They are preferably two-component mixtures, in which a solidification reaction is started only by mixing them together. The build material may also be present in the form of a dispersion. Materials or build materials or a material system within the meaning of the invention may consist, in particular, of concrete or mortar, a mixture of a filler and a reactive resin system, a mixture of a foundry molding material and a reactive resin system which is common in foundries, a mixture of a filler and water glass or a mixture of particles and meltable material. Build materials within the meaning of the invention are described in more detail below.

"Layer thickness" within the meaning of the invention is set selectively, depending on the material and special method implementation. It may remain the same throughout the method or be varied during the course of the method. The layer thickness is preferably in the range of 50 to 500 µm, more preferably 100 to 400 µm and even more preferably 150 to 300 µm.

The "solidification reaction of the build material" within the meaning of the invention has already begun when the build material is applied. It may be accelerated by suitable measures, such as regulating the temperature of the build space, or initially started by an activation measure. An application of energy in the form of heat or thermal radiation may be used for this purpose.

A "reaction-inhibiting" or "reaction-stopping material" or "liquid" within the meaning of the invention—also referred to as a "retarding agent"—is any material which is able to slow down, inhibit or entirely stop a solidification of the building material by being applied. A "retarding agent" within the meaning of the invention is a substance that influences and slows down the hardening process. These include bases, acids, alcohols, hydrophobic solutions, oils, hydroquinone, or substances having monofunctional groups.

"Binding agents" within the meaning of the invention may preferably be a cement or gypsum, an acrylate or styrene, a polyurethane, an epoxy resin, a polyester and/or a polyamide. Additional details are discussed below.

An "activation step" within the meaning of the invention is a method measure which causes the solidification reaction to progress faster and/or more completely. In one preferred implementation of the method, an activation step may also mean a crossing of a threshold which is critical for the particular reaction, which results in the controlled starting of the solidification reaction.

Reactions within the meaning of the invention may preferably be—without being limited thereto—a hydration, a polymerization or a phase transition reaction.

The mechanism according to the invention is based in part on the "retardation" or blocking of the hardening process. A duration of the retardation which makes it possible to safely remove deposits from the component is meant hereby. In the case of activatable materials, the duration is nearly unlimited.

"Deposits" are partially solidified areas which occur outside the geometric boundary of the component. They are generally undesirable and should be removable by means of brushing, blowing off or powder blasting.

"Outer area" describes the surface outside the geometric boundary of the component. According to the invention, a retarding agent is applied here. This may take place, according to the invention, over the entire surface or only on the component boundaries or outside the component in each layer, or partially.

"Melting temperature" within the meaning of the invention relates to a temperature which must be present in the build space and ultimately in the build material in order for a solidification process to result. It may vary and depends on the particular materials used.

In the method according to the invention, the particulate material (build material) is preferably selected from the group consisting of freshly mixed concrete or mortar, a mixture of a filler and a reactive resin system, a mixture of a foundry molding material and a reactive resin system common in foundries, a mixture of a filler and water glass or a mixture of particles and meltable material, the mixture being heated to a temperature above the melting temperature of the meltable material prior to application.

In the method, the build material is normally mixed intimately in a means provided for this purpose shortly before being applied, and a hardening reaction then independently sets in. Additional activation steps or solidification measures, such as sintering, are no longer necessary to obtain the hardened component.

However, it may be advantageous to additionally carry out an activation step to accelerate the method and the build process for producing the 3D molded parts. This activation step preferably takes place after the application from the print head.

The additional activation step preferably takes place by means of irradiation, more preferably with the aid of IR radiation.

It may be advantageous for different reasons, for example to obtain advantageous material properties in the 3D components, to delay the solidification reaction in the method according to the invention by hours, particularly preferably by multiple days, or to essentially stop it altogether.

In another preferred embodiment, the method and the materials for building the 3D molded part may be selected in such a way that the solidification reaction is started by radiation.

The solidification reaction may be based on different mechanisms, depending on the selected build materials. The solidification reaction may be a hydration, a polymerization or a phase transition reaction.

Any suitable binding agent may be used which is compatible with the other material components and device means. A cement or gypsum, an acrylate or styrene, a polyurethane, an epoxy resin, a polyester and/or a polyamide is/are preferably used as the binding agent.

In another aspect, the invention relates to the use of a material system, as described herein, in a 3D printing method described herein.

The invention furthermore relates to a device for carrying out a 3D printing method according to the invention.

In another aspect, the invention relates to a device which includes means known to those skilled in the art for carrying out a 3D printing method. This device has particular device means, modified in a special manner or additionally, to be able to carry out the method according to the invention.

Those skilled in the art will understand that precautions must be taken to carry out the method according to the invention, in order to ensure a fault-free operation, for example, of the print head.

The print head may be specially designed in different aspects for this purpose, such as being coated with non-stick media to prevent the print head from sticking. For example, a Teflon coating of the print head may be provided in this case.

Another advantageous embodiment of the printing device may consist in the fact that the device includes a cleaning station for the print head and/or the coating means (coater, recoater). The print head and/or the coater is/are preferably moved to this cleaning station after each coating, more preferably after every tenth coating, or as needed, and is freed of contaminants of the applied materials (build material/particulate material, material mixture, reaction-inhibiting or reaction-stopping liquid). At the cleaning station, contaminants are removed from the coater along its entire length.

In the method according to the invention, build material which is already capable of binding or bonding or hardening, or whose material components pass through a reaction that permits a binding of the particle components, is already situated in the coater.

One approach for keeping the coater operational and protecting it against contaminants or from being clogged with binding material therefore consists in the fact that the device has a so-called dump station, to which the coater is moved while other method steps are being carried out, or there is, for example, a coating pause during the course of the method. This dump station is designed in such a way that the coater continues the coating process here and thereby ensures that the build material is continuously dispensed, and a clogging by the build material is prevented.

Once the coating operation is to be continued in the method, the coater is returned to the building platform, and the build process of the 3D model may be continued.

The method according to the invention furthermore uses build material, in which the binding reaction/solidification reaction has already started when the coater is filled. To minimize the so-called dead material, which is ultimately not used in the build process, the material components are mixed with each other using a mixing means a short time prior to filling the coater. This has multiple advantages. Due to the relatively small amounts of this mixture, an intimate mixing as well as a good reaction and thus solidification in the build material is ensured, which has a positive effect on the material properties of the 3D component produced. In addition, the amount of dead material in the material to be discarded is kept as small as possible, and the use of material is thus also minimized.

As a result, in one preferred embodiment, the device comprises a cleaning station for the coater and, if necessary, for the print head, a mixing device for the build material and preferably a dump station for discharging dead material, in addition to the usual structural means of a 3D printing device.

In another preferred aspect, the invention thus relates to a device, suitable for 3D printing, comprising a movable building platform, a coater for applying build material which is a self-hardening material mixture, at least one print head unit, at least one mixing unit, at least one cleaning unit for cleaning the coater, if necessary, at least one cleaning unit for cleaning the print head unit and, if necessary, a receiving unit for receiving build material.

The receiving unit is preferably used to receive dead material which is not used for the build process, while the coater must be moved into a waiting position due to other work steps to be carried out. By discharging build material from the coater into this receiving unit, it is advantageously achieved that the coater is not contaminated, remains fully operational, and the coating may continue in a precise manner after the waiting position and waiting time. This also partially avoids the need for cleaning, or at least reduces the cleaning cycles. This has a positive effect on the process speed and increases the productivity of the build process, while maintaining the same standard of quality.

BRIEF DESCRIPTION OF THE FIGURES

The figures describe 3D printers from the prior art as well as preferred specific embodiments of the invention.

REACTION SCHEMATA

Figure 1:
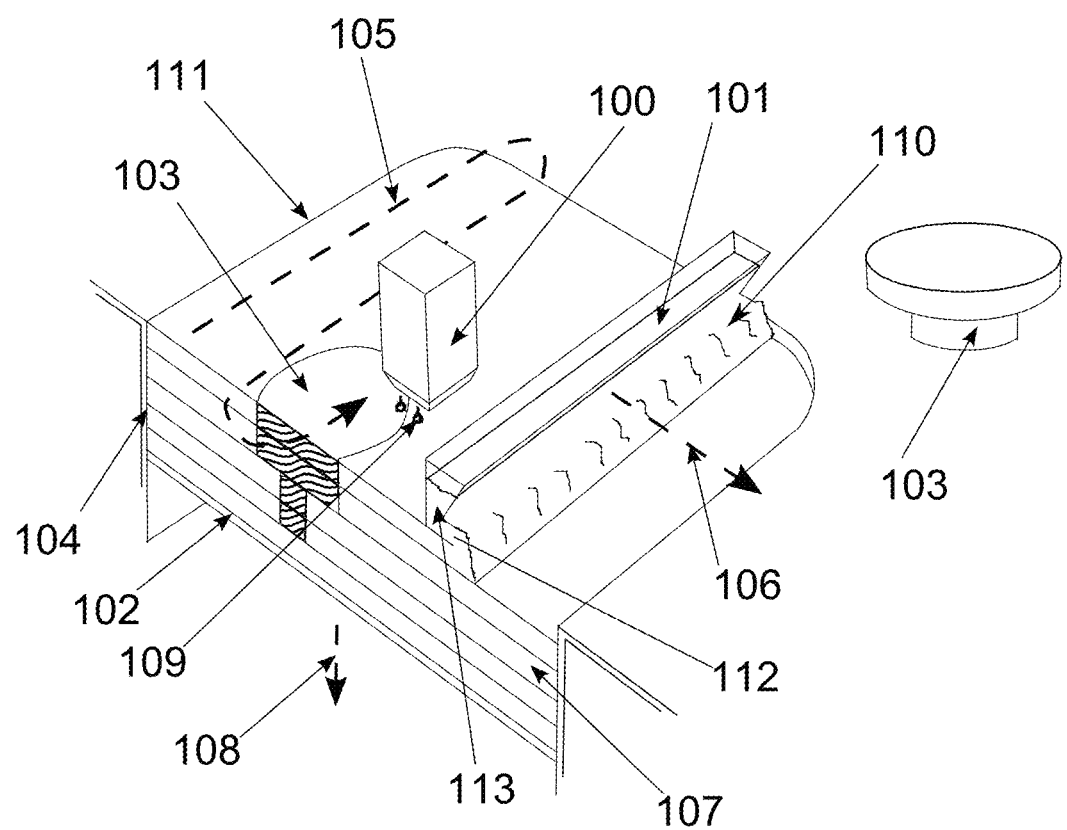
FIG. 1: shows a schematic representation of the components of a powder-based 3D printer in an isometric view.

Schema 1: Chemical reaction of a reaction-inhibited cold resin method which may be used according to the invention.

Schema 2: Chemical reaction of a reaction-inhibited cold-box method which may be used according to the invention.

Preferred Embodiments of the Invention

In a first step, a liquid or powdered material (build material) is applied to a building platform and smoothed with the aid of a coater. This material solidifies on its own over time or preferably by means of an activation process. The material may solidify, for example, by means of drying. A chemical reaction that progresses slowly is also conceivable. Physical processes, such as a phase transition, are also conceivable.

A liquid substance, or a substance located in a liquid, which slows down or blocks the particular solidification mechanism, is then applied via an ink jet print head (print head) before or after an optional solidification step.

A solidification step may be, e.g., a drying process following the print process. However, a UV activation of a hardenable polymer is also conceivable.

The building platform is subsequently lowered by one layer thickness.

The aforementioned steps are repeated until the desired body has been created.

In the end, the material surrounding the component and the deposits are removed. This may take place by brushing, blasting or rinsing, depending on the type of the mechanism.

The advantages of this method are that the slowing down or blocking of the solidification mechanism may usually be achieved using a very small amount of an inhibiting medium. This medium is usually easier to dose than the solidifying materials.

In addition, intimate mixtures may be achieved in this manner. The material may be intensively prepared using the customary mixing tools. Powerful mixing energies may be used.

The third aspect relates to the introduction of reinforcements into the component. Due to the premixing, much more complex materials may be processed as a layer than when using prior-art methods.

The consolidation of the base material is likewise influenced. Methods for the liquid dispensing of powder materials may be used, which advantageously influence an efficient particle packing.

In summary, the inventors have developed a means for advantageously making the use of materials accessible to 3D printing methods which were previously unusable for 3D printing. For example, a conventional concrete may be processed.

The result is a component which is in no way inferior to a cast quality. For example, a plastic component may likewise be produced from highly viscous reactive resins. Strengths that are excellent for additively produced components are associated therewith.

Other Preferred Embodiments of the Invention

The system according to the invention draws heavily on powder-based 3D printing. The mechanical engineering is augmented to meet the requirements according to the invention.

The device according to the invention includes a coater (2). This coater is used to apply and smooth premixed particulate material or a liquid containing particulate material onto a building platform (3) (FIG. 2(a)). The applied particulate material may consist of a wide range of materials. For example, sands, ceramic powders, metal powders, plastic, wood particles, fibrous materials, celluloses, lactose powders, etc. may be used. The flow characteristics of these materials may vary enormously. Different coater techniques permit layering from dry, free-flowing powders and cohesive, firm powders to liquid-based dispersions. The height of powder layers (4) is determined by building platform (3). It is lowered after one layer has been applied. During the next coating operation, the resulting volume is filled and the excess smoothed. The result is a nearly perfectly parallel and smooth layer of a defined height.

According to the invention, the solidification process of the applied build material begins before the application, since all components needed for the reaction have been recently mixed intimately in a mixing means. The build material is thus produced in a preparation means prior to dispensing and quickly fed to the coater. The transport times and flow rates are monitored. If an error occurs, the material is not supplied to the machine, and the machine is rinsed with neutral material. The neutral material may comprise, for example, a passive component of the build material.

The material feed is structurally carried out without any dead space. I.e., the material flow always carries along all material quantities located in the feed laminarly.

Figure 2:
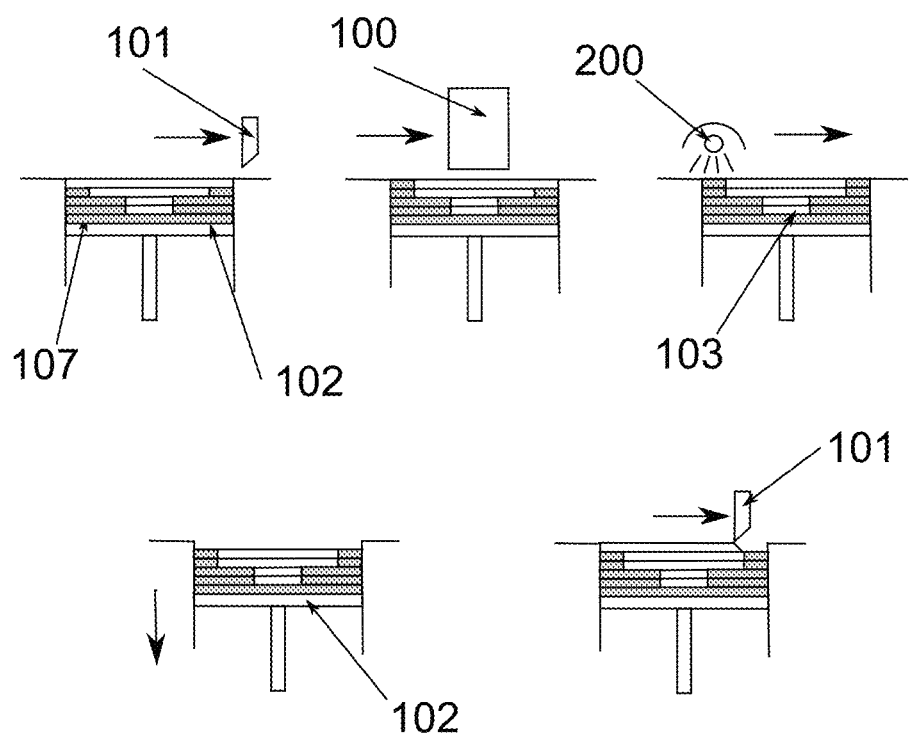
FIG. 2: shows a sequence of a conventional 3D printing process with the use of a layered radiation hardening technique.
Figure 3:
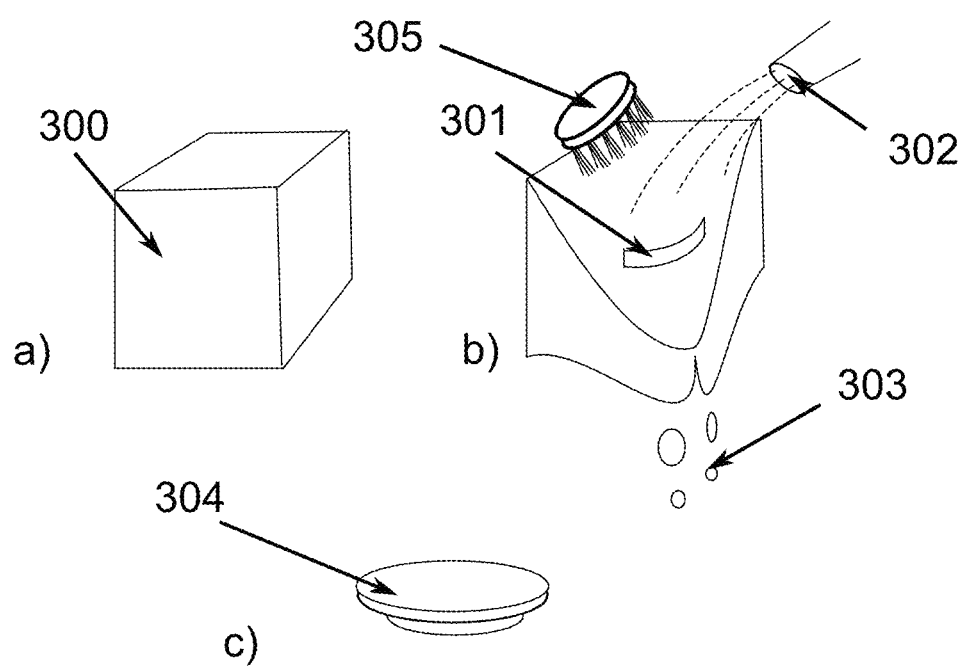
FIG. 3: shows a diagram of the unpacking of components from a reaction-inhibited material which may be used according to the invention.

After a coating process, the layer is printed with a liquid—the so-called retarding agent—with the aid of an ink jet print head (1) (FIG. 2(b)). The print image corresponds to the inverted section of the component in the present build height of the device. The liquid slowly and diffusively penetrates the particulate material.

Following the method according to the invention, the retarding agent solidifies the layer during or shortly after printing (FIG. 2(c)). To speed up this process, or to initiate the hardening, an IR radiator (5), for example, may be additionally passed over the build space in one preferred embodiment. This IR radiator may be coupled with the axis of the coating system. The solvent evaporates during heating. In the case of liquids that present a fire hazard, the evaporating material is extracted immediately (7).

This process may be used to influence, and preferably to speed up, the time sequences of the solidification reaction. The period of time until the parts are unpacked may be shortened thereby.

In the method according to the invention, a job block (300) is generally produced by the build process, from which the embedded components (301) must be removed following the build process. This procedure may take place, e.g., by rinsing with a liquid (302, 303). Likewise or additionally, the component may be exposed by scrubbing or brushing manually (305).

Brief descriptions of preferred material systems are provided below. In each case, the overall process is briefly illustrated.

Cement-bound material An aggregate, such as sand, is mixed with a cement paste, water and additives. This paste-like substance is applied to a building platform with the aid of a special coater.

An acidic sugar solution is dispensed as the reaction-retarding substance onto the areas that are not to be solidified. This combination interferes with the hydration of the cement and thus the solidification.

After a certain binding time, the resulting job block may be detached with the aid of water. The "retarded" material is then brushed off under the action of water. The rinsing solution is environmentally safe, since it is non-toxic.

The component produced in this manner is comparable to a cement component produced by casting in terms of its condition and strength characteristics.

Polymer Synthesis Reaction (Cold Resin)

A reaction-retarded cold resin binding agent for metal casting applications is mixed with a hardener and sand as a batch and fed into the coater. The latter applies the build material as a layer. Compared to the prior art, a special coater is used, which is able to process very cohesive sand mixtures.

An ink-jet print head prints a basic substance in the area in which the sand is to be removed later on. Only a small quantity of a highly basic-acting substance must be applied.

The build material completely solidifies in this process without a substance being printed thereon. Special measures must be taken to protect the mixer, coater and build container.

The result of this process is a porous mold or a core having a cold resin binding, which may be used in metal casting in the known manner.

Polymer Synthesis Reaction (Polyurethane)

An at least difunctional prepolymer isocyanate is mixed with at least difunctional phenol-containing polyol and other additives and with foundry sand. The mixture is set in such a way that the polymerization reaction takes multiple tens of minutes or sets in only after at least this dwell time.

In the area where the sand is to be removed later on, an ink-jet print head prints a substance which, on the one hand, is monofunctional and, on the other hand, reacts with a reactive component much faster than with the multifunctional reactant. The reactive groups needed for a polymerization are reduced thereby. In this system, for example, a printing of compounds with the formula R—OH or R1—NH—R2 is efficacious, short-chain alcohols, such as ethanol or 2-propanol being preferred with regard to the resulting reaction products. Isocyanate groups are effectively and irreversibly deactivated with these substances.

For unpacking, the loose sand is brushed and blasted off.

The result is a casting mold for metal casting applications of the cold box type known in this field.

Polymer Synthesis Reaction (Polyacrylate)

A base material, such as expanded glass or a polymer, is mixed with radically polymerizable acrylates. A photoinitiator is also added to the system.

In the area where the base material is to be removed later on, an ink-jet print head prints a substance which interferes with the further concatenation or deactivates the photoinitiator. These may be known inhibitors such as TEMPO or hydroquinone.

The printing process is followed by an exposure to light using a UV lamp. Due to the deactivated photoinitiator, either no radicals for the polymerization, or only as many radicals as can be immediately absorbed by the added inhibitors, are formed in the printed areas. As a result, no solidity may build up in the printed areas.

The result of this process is a filled plastic component. The latter may be used as a function component in industrial applications or as a visual aid.

Phase Change

Figure 4:
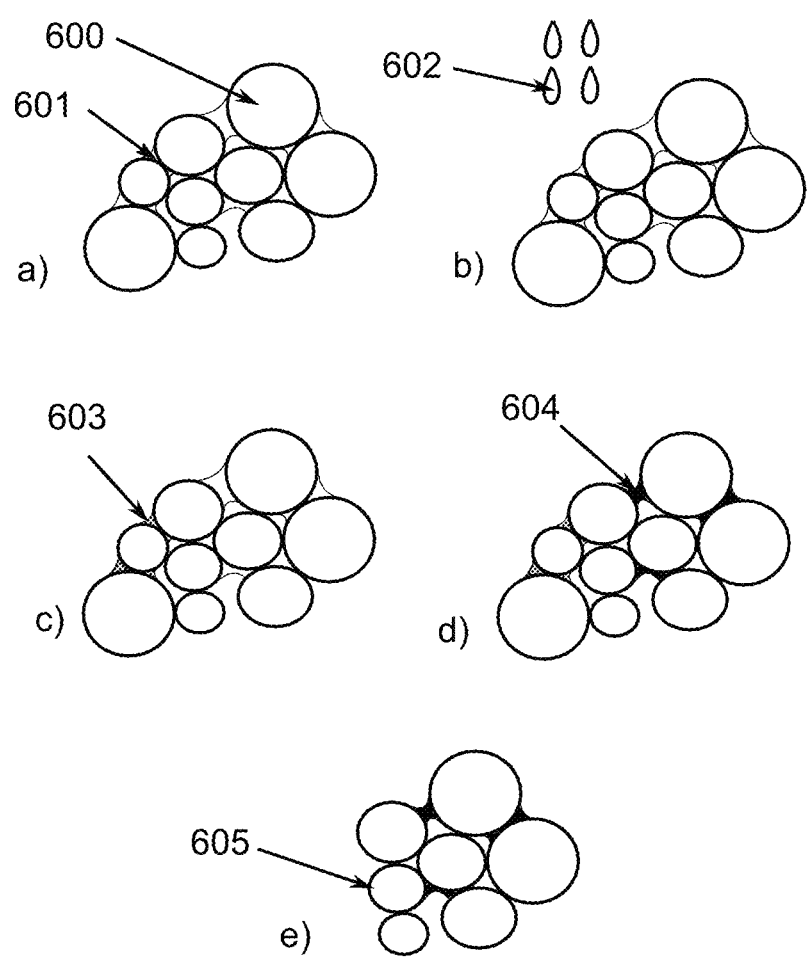
FIG. 4: shows a diagram of an inhibited phase transition reaction which may be used according to the invention.

A base material (600), e.g. polystyrene powder, is mixed with a wax (601) and heated to a temperature above its melting point (FIG. 4a). In the hot state, it is applied to the building platform with the aid of the coater. The temperature in the build space is maintained above the melting point of the wax.

This layer is printed with oil drops (602), e.g., paraffin oil (FIG. 4b). This oil is mixable with the hot wax. This mixture (603) is located between the particles in the outer area.

During the slow cooling process, a solidity forms in the unprinted area, due to the cooled particle bridges (604). In the printed area, the oil interferes with the formation of solidity. The particles in this area (outside component contour 605) may subsequently be easily brushed off.

The component produced in this manner may be used as a so-called wax model for investment casting applications.

To simplify the separation of the desired component and the surrounding material, printing the retarding agent only linearly along the outer contour of the particular layer cross section and printing the areas outside the component contour with a grid are expedient for reasons of material economy. If all-over separating planes are now inserted in a certain order, a cube structure arises around the component, which may be easily removed, even from complex geometric sections. The size of the cube geometry may be either set as standard, or it may automatically adapt to the component contour with the aid of corresponding algorithms.

A number of reaction schemata are furthermore illustrated for the material systems according to the invention:

Reaction schema 1 (chemical reaction, cold resin/reaction stop)

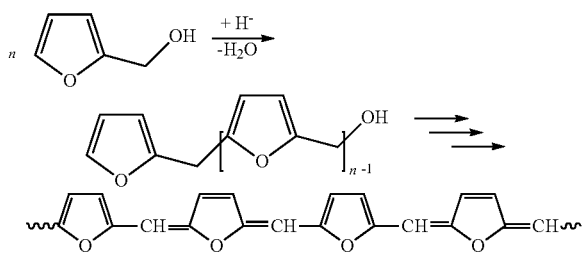

Reaction of furfuryl alcohol with condensation under acidic conditions; increase in pH value prevents the reaction from taking place.

Reaction schema 2 (chemical reaction, cold box)

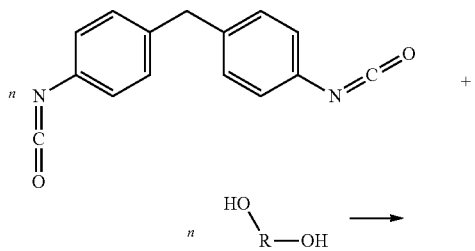

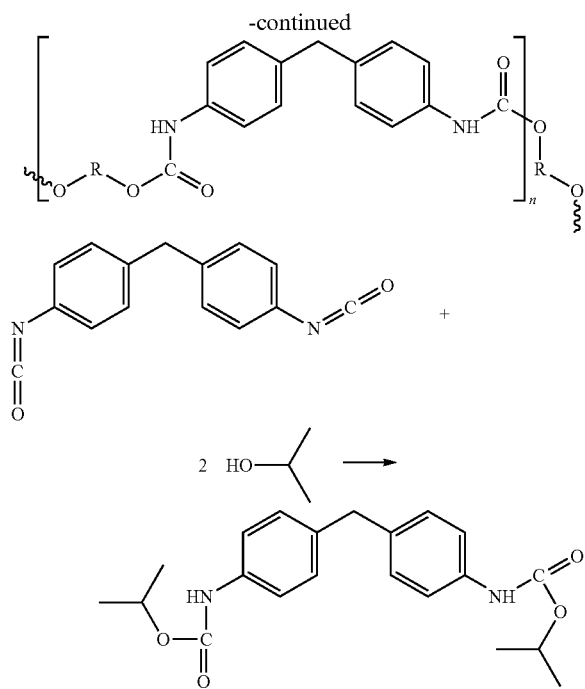

Polymerization is prevented by a competition reaction of the isocyanate with 2-propanol.

List of Reference Numerals
100 Ink-jet print head
101 Powder coater
102 Building platform
103 Component
104 Build space boundary
107 Powder layers
200 Solidifying unit
300 Job block
301 Embedded component
302 Rinsing nozzle
303 Dripping material in the outer area
304 Exposed component
305 Brush
600 Base particles
601 Liquid wax
602 Oil drops
603 Bridge of wax/oil
604 Solidified wax
605 Component contour

What is claimed is:

1. A method for producing three-dimensional models using a layering technique, comprising the steps of:
applying a particulate build material to a build space in a defined layer thickness in the form of a powder or a dispersion,
selectively applying a liquid via a print head to the particulate build material in one or more areas in which the particulate build material is not to be solidified by a solidification reaction, and
moving the build space wherein these steps are repeated until the desired model is produced, wherein the solidification reaction of the build material has already started, starts or may be started by introducing energy upon the application of the build material, and the liquid is a reaction-inhibiting liquid or a reaction-stopping liquid;
wherein the particulate build material is selected from the group consisting of a mixture of a foundry molding material and a reactive resin system common in foundries, or a mixture of a filler and water glass.

2. The method of claim 1, wherein the particulate build material includes a metal powder, a wood particle, a cellulose, or a lactose powder.

3. The method of claim 1, wherein an additional activation step takes place after the application from the print head.

4. The method of claim 1, wherein the solidification reaction is delayed for hours,
optionally wherein the solidification reaction is delayed for multiple days or completely stopped by the liquid.

5. The method of claim 1, wherein the solidification reaction is started by radiation.

6. The method of claim 1, wherein the solidification reaction is a hydration, a polymerization or a phase transition reaction.

7. A method for producing three-dimensional models using a layering technique, comprising the steps of:
applying a particulate build material to a build space in a defined layer thickness with a coater,
selectively applying a liquid via a print head to the particulate build material in one or more areas in which the particulate build material is not to be solidified by a solidification reaction, and
moving the build space wherein these steps are repeated until the desired model is produced, wherein the solidification reaction of the build material has already started upon the application of the build material prior to the step of selectively applying the liquid, and the liquid is a reaction-inhibiting liquid or a reaction-stopping liquid;
wherein the particulate build material includes a powder material, and a binding agent,
wherein the binding agent includes an acrylate, a styrene, a polyurethane, an epoxy resin, a polyester or a polyamide.

8. The method of claim 1, wherein the build space is on a build platform and the step of moving the build space includes lowering, raising or horizontally moving the build platform, wherein the build platform is moved by the layer thickness.

9. The method of claim 1, wherein no sintering step is carried out.

10. The method of claim 3, wherein the additional activation step takes place with the aid of irradiation, optionally infrared radiation.

11. The method of claim 1, wherein the solidification reaction starts prior to the step of selectively applying the liquid.

12. The method of claim 1, wherein the liquid includes a monofunctional reactant.

13. The method of claim 9, wherein no binder material is selectively applied.

14. The method of claim 1, wherein the build material is a self-hardening material mixture and is applied with a coater.

15. The method of claim 14, wherein the liquid slows down or prevents a self-hardening reaction of the build material.

16. The method of claim 1, wherein the method includes a step of cleaning the print head with a cleaning unit.

17. The method of claim 1, wherein the particulate build material includes a sand, a ceramic powder, a metal powder, a wood particle, a fibrous material, a cellulose, or a lactose powder.

18. The method of claim 1, wherein the build space is on a build platform and the step of moving the build space includes lowering, raising or horizontally moving the build platform, wherein the build platform is moved by the layer thickness.

19. The method of claim 7, wherein the build space is on a build platform and the step of moving the build space includes lowering, raising or horizontally moving the build platform, wherein the build platform is moved by the layer thickness.

20. A method for producing three-dimensional models using a layering technique, comprising the steps of:
applying a build material including a powder material and a phase change material to a build space in a defined layer thickness, wherein the build material is applied at a build space temperature above a melting temperature of the phase change material;
selectively applying a liquid via a print head to the build material in one or more areas in which the build material is not to be solidified, wherein the liquid interferes with the solidification of the phase change material; and
moving the build space;
wherein these steps are repeated until the desired model is produced, and
cooling the build material, whereupon the phase change material solidifies and forms solid bridges between particles of the powder in a region that is not printed with the liquid, and the phase change material does not solidify in a region that is printed with the liquid; and
removing the build material printed with the liquid from the three-dimensional model.

21. A method for producing three-dimensional models using a layering technique, comprising the steps of:
applying a build material including an aggregate material, a cement paste, water, and additives to a build space in a defined layer thickness, wherein the build material is applied as a paste-like substance;
selectively applying a liquid via a print head to the build material in one or more areas in which the build material is not to be solidified, wherein the liquid includes an acidic sugar solution that interferes with hydration of the cement; and moving the build space;
wherein these steps are repeated until the desired model is produced; and the method includes allowing a sufficient binding time for a region without the printed liquid to solidify; and
removing the build material printed with the liquid from the three-dimensional model.

22. A method for producing three-dimensional models using a layering technique, comprising the steps of:
applying a build material including an aggregate material, a paste, water, and additives to a build space in a defined layer thickness, wherein the build material is applied as a past-like substance, and the aggregate material is a metal or a ceramic;
selectively applying a liquid via a print head to the build material in one or more areas in which the build material is not to be solidified, wherein the liquid is a reaction-inhibiting liquid or a reaction stopping-liquid; and
moving the build space;
wherein these steps are repeated until the desired model is produced,
wherein a solidification reaction of the build material starts before introducing energy or starts by introducing energy;
allowing a sufficient binding time for a region without the printed liquid to solidify; and
removing the build material printed with the liquid from the three-dimensional model.

23. The method of claim 21, wherein the liquid includes the acidic sugar solution, an acid, or a hydrophobic solution.

* * * * *